United States Patent
Wang et al.

(10) Patent No.: US 7,419,608 B2
(45) Date of Patent: Sep. 2, 2008

(54) TREATING METHOD AND EQUIPMENT FOR COKE-COOLING WASTEWATER

(75) Inventors: Hualin Wang, Shanghai (CN); Zhuoqun Qian, Shanghai (CN); Jianwen Wang, Shanghai (CN); Baohua Dai, Ningbo (CN); Jiangqing Hu, Ningbo (CN); Shuilong Yu, Ningbo (CN); Chengyu Xu, Ningbo (CN); Tianming Hou, Ningbo (CN); Hejie Li, Luoyang (CN); Jianghua Xu, Luoyang (CN); Lixin Zhang, Luoyang (CN)

(73) Assignees: East China University of Science and Technology, Shanghai (CN); Sinopec Zhenhai Refining & Chemical Company Limited, Zhejiang (CN); Luoyang Petrochemical Engineering Corporation (LPEC) Sinopec, Henan (CN)

( * ) Notice: Subject to any disclaimer, the term of this patent is extended or adjusted under 35 U.S.C. 154(b) by 0 days.

(21) Appl. No.: 11/748,829

(22) Filed: May 15, 2007

(65) Prior Publication Data
US 2007/0262032 A1 Nov. 15, 2007

(51) Int. Cl.
*C02F 1/02* (2006.01)
*C02F 1/40* (2006.01)

(52) U.S. Cl. ............ 210/774; 210/787; 210/800; 210/803; 210/805; 210/167.01; 210/181; 210/195.1; 210/252; 210/258; 210/259; 210/512.2; 210/513; 208/50; 208/126; 208/131; 208/132; 44/281

(58) Field of Classification Search ............ None
See application file for complete search history.

(56) References Cited

U.S. PATENT DOCUMENTS

| | | | | | |
|---|---|---|---|---|---|
| 3,917,564 | A | * | 11/1975 | Meyers | 208/131 |
| 3,936,358 | A | * | 2/1976 | Little | 201/39 |
| 4,100,035 | A | * | 7/1978 | Smith | 202/227 |
| 4,666,585 | A | * | 5/1987 | Figgins et al. | 208/131 |
| 4,670,133 | A | * | 6/1987 | Heaney et al. | 208/131 |

(Continued)

FOREIGN PATENT DOCUMENTS

CN 2533134 Y 1/2003

(Continued)

*Primary Examiner*—Robert James Popovics
(74) *Attorney, Agent, or Firm*—Scott D. Rothenberger; Dorsey & Whitney LLP

(57) ABSTRACT

The present invention falls within the field of purifying oil-laden wastewater, which provides a method for purifying coke-cooling wastewater in a delayed coking process in petroleum chemical field. The method comprises the following steps: (a) cooling the coke-cooling wastewater produced in a delayed coking process to 5-55° C. under 0.1-0.25 MPa absolute pressure, to obtain cooled coke-cooling wastewater; (b) subjecting the cooled coke-cooling wastewater to solid-liquid separation, to obtain a coke breeze phase and a liquid phase; (c) further separating the obtained liquid phase, to obtain an oil phase and a water phase; and (d) further discharging water from the obtained oil phase, to obtain the separated oil phase. The present invention also provides an equipment for carrying out the method. The method of the present invention has the following advantages: low cost for the equipment, good effect for treating coke-cooling wastewater, effectively preventing sulfur pollution and foul odor pollution, saving resources and improving the overall utility of the resources, and improving the cool coking efficiency.

14 Claims, 1 Drawing Sheet

U.S. PATENT DOCUMENTS

| | | | | |
|---|---|---|---|---|
| 4,737,264 A | * | 4/1988 | Heaney et al. | 208/131 |
| 4,874,505 A | * | 10/1989 | Bartilucci et al. | 208/131 |
| 4,968,407 A | * | 11/1990 | McGrath et al. | 208/131 |
| 5,009,767 A | * | 4/1991 | Bartilucci et al. | 208/85 |
| 5,041,207 A | * | 8/1991 | Harrington et al. | 208/131 |
| 5,114,564 A | * | 5/1992 | Goyal | 208/131 |
| 5,200,061 A | * | 4/1993 | Viscontini | 208/131 |
| 5,223,152 A | * | 6/1993 | Freymeyer et al. | 210/774 |
| 5,376,262 A | * | 12/1994 | Perry | 210/651 |
| 5,443,717 A | * | 8/1995 | Scalliet et al. | 208/131 |
| 5,520,795 A | * | 5/1996 | Wong et al. | 208/46 |
| 6,204,421 B1 | * | 3/2001 | Genssler et al. | 585/240 |
| 2007/0262032 A1 | * | 11/2007 | Wang et al. | 210/767 |

FOREIGN PATENT DOCUMENTS

| | | |
|---|---|---|
| CN | 1105689 C | 4/2003 |
| JP | 6-287563 A1 | 10/1994 |
| JP | 10-88144 A1 | 4/2000 |
| JP | 5-320656 A1 | 12/2002 |
| WO | WO 89/07636 A1 | 8/1989 |

* cited by examiner

TREATING METHOD AND EQUIPMENT FOR COKE-COOLING WASTEWATER

CROSS-REFERENCE TO RELATED APPLICATIONS

This application is a continuation of International application number PCT/CN2005/000476, filed Apr. 11, 2005 which claims priority to Chinese application No. CN 200410068149.X filed Nov. 15, 2004, the contents of both are herein incorporated in their entirety by reference.

FIELD OF THE INVENTION

The present invention falls within the field of purifying oil-laden wastewater, which relates to a treating method for coke-cooling wastewater, and particularly relates to a method for purifying coke-cooling wastewater in a delayed coking process in the petroleum chemical field, as well as an equipment for carrying out the method.

BACKGROUND OF THE INVENTION

It is well known to those skilled in the petroleum chemical field that delayed coking process is one of the main technical means for transforming cheap heavy oil into light oil product having high additional value currently, which is important in oil refining industry of the world. The delayed coking process is one of the sources of the main economic benefit in oil refining combined equipments, and even is a heavy oil processing method mainly developed by many countries such as China and the United States. However, the delayed coking process needs a large amount of cooling water, thus inevitably producing a large amount of coke-cooling wastewater. In particular, the coke-cooling wastewater produced in the delayed coking oil refining process, which uses high sulfur heavy oil as raw material, not only contains solid coke breeze and liquid heavy oil, but also contains many sulfides (including inorganic sulfides and organic sulfides), the temperature of which is up to 85-125° C., having already been one of the main pollution sources which compromises the human living environment, and being a difficult problem puzzling people in a long time.

Chinese utility model patent ZL 02216056.6 discloses a closed-cycling process unit for delayed coke-cooling water, which is desired to solve the problem of purifying coke-cooling wastewater. However, such a process unit is proved to have the following defects in practice:

1. Cyclone deoiling separators and air coolers, both of which have multistage structures in series, are needed, so the cost of the process unit is large. Furthermore, hot-water pump for coke-cooling wastewater having high lift is requested due to large pressure drop in system.

2. The cyclone deoiling separator is easy blocked due to coke breeze in the coke-cooling wastewater, thus the operating condition of the cyclone deoiling separator deteriorates continuously, and if serious, the production will be forced to stop.

3. In the coke-cooling hot wastewater tank, coke breeze is continuously cumulated and deposited, so the coke-cooling hot wastewater tank should be cleaned frequently, thus affecting the long-time cycle run of the process unit, and when cleaning the deposit, the released foul odor will inevitably cause secondary pollution.

4. In this utility model patent, the process for treating coke-cooling wastewater uses conventional cyclone equipments in the industry. However, these conventional cyclone equipments do not possess anti-oil emulsification effect against wastewater containing sulfur and oil. (The oil phase of the wastewater containing sulfur and oil is extremely easy to be broken and emulsified during delivery by pumping, this patent, however, pays no attention to this case.) Therefore, the separating efficiency of single stage cyclone is inevitably very low, which should be remedied by using multistage cyclones in series, thus causing the cost of the equipment double, and the problem of oil emulsification still cannot be solved. The treated water phase has much emulsified oil, which will significantly affect the efficiency of cool coking process when returning to coke tower for circulation.

Summing up, since the prior art has the above problems, up to the present, the problem of the scientific cleaning of coke-cooling wastewater cannot be solved, and the expectation of industrialization of petroleum chemical clean production cannot be met. Therefore, the art is urgent to develop a treating method for coke-cooling wastewater with low cost and good benefit, and an equipment.

SUMMARY OF INVENTION

The object of the present invention is just to provide a treating method for coke-cooling wastewater with low cost and good benefit, and an equipment therefor.

In the first aspect of the present invention, a method for treating coke-cooling wastewater is provided, which comprises the following steps: (a) cooling the coke-cooling wastewater produced in a delayed coking process to 5-55° C. under 0.1-0.25 MPa absolute pressure (0-0.15 MPa gauge pressure, wherein 0 MPa corresponds to normal pressure), to obtain cooled coke-cooling wastewater; (b) subjecting the cooled coke-cooling wastewater to solid-liquid separation, to obtain a coke breeze phase and a liquid phase; (c) further separating the obtained liquid phase, to obtain an oil phase and a water phase; and (d) further discharging the water from the obtained oil phase, to obtain the separated oil phase.

In a preferred embodiment, the amount of the coke breeze in the coke-cooling wastewater is 0.01-2% by weight.

In another preferred embodiment, after the water phase is cooled to 5-50° C. through heat exchange, 60-90% of the water goes through water circulation cool coking process, while 10-40% of the water is mixed with the coke-cooling wastewater.

In another preferred embodiment, in the step (d), the water is discharged from the obtained oil phase through gravity settling, and the discharged water is utilized for water circulation; while the separated oil phase is reprocessed for oil circulation or used in oil refining by combining with raw heavy oil.

In another preferred embodiment, when the cool coking process is ended, the coke-cooling wastewater treating process continues until the amount of the coke breeze in the coke-cooling wastewater is lowered to 0.01% by weight.

In the second aspect of the present invention, an equipment for the method for treating coke-cooling wastewater is provided, which comprises: coke tower (1); line blender (29) connected to the coke tower (1), which is used to cool the coke-cooling wastewater from the coke tower (1); coke breeze separator (5) used to separate the coke-cooling wastewater blended in the line blender (29); closed coke pool (2) connected to coke breeze phase outlet (18) of the coke breeze separator (5); oil-water separator (6) connected to liquid phase outlet (19) of the coke breeze separator (5); and oil tank (9) connected to oil phase outlet (22) of the oil-water separator (6), which is used to further separate the oil phase.

In a preferred embodiment, the coke breeze separator (5) is also connected to coke-cooling hot wastewater tank (3) storing the coke-cooling wastewater through its coke breeze phase outlet (18).

In another preferred embodiment, the oil-water separator (6) is also connected to heat changer (7) through its water phase outlet (21), and cool coke water tank (8), which is connected to the heat changer (7) and stores the cool coke water treated by heat exchange and cooled to lower than 50° C., is respectively connected to the coke tower (1) and the line blender (29).

In another preferred embodiment, the oil tank (9) is also respectively connected to the coke breeze separator (5) which circularly utilizes the discharged water from the bottom of the oil tank (9), and the coke tower (1) which circularly utilizes the separated oil phase from the top of the oil tank (9).

In another preferred embodiment, a hot water pump (4) used to pump the coke-cooling wastewater is disposed between the coke-cooling hot wastewater tank (3) and the coke breeze separator (5), and the hot water pump (4) is preferably a delivery pump controlled by frequency control technique.

In another preferred embodiment, the line blender (29) is a venturi type blender or a jet pump.

In another preferred embodiment, the coke breeze separator (5) is a hydrocyclone or a gravity separator.

In another preferred embodiment, the oil-water separator (6) is selected from the group consisting of an improved cyclone oil-water separator, coarse granulation oil-water separator, and cyclone-jet flow-coarse granulation oil-water separator.

In another preferred embodiment, the heat changer (7) is selected from one or more of air cooling type heat changer, shell type heat changer, plate type heat changer, plate-fin type heat changer, and spiral laminal type heat changer, which are connected in parallel, or connected both in series and in parallel.

DETAILED DESCRIPTION OF INVENTION

Figure 1:
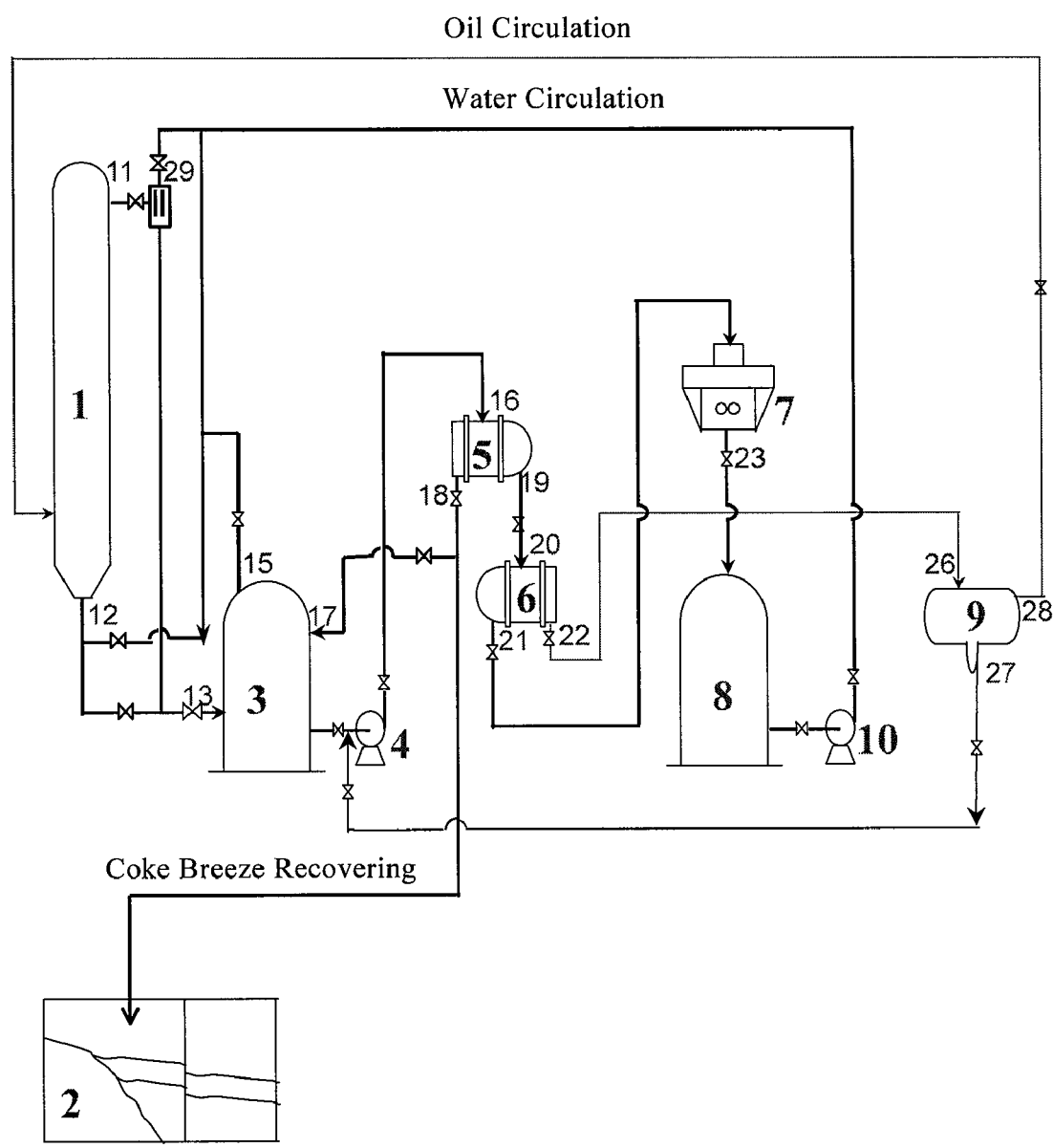
FIG. 1 is a schematic view showing an equipment for treating coke-cooling wastewater in accordance with an embodiment of the present invention.

The present invention provides an improved method for purifying coke-cooling wastewater in a delayed coking process in petroleum chemical field, thus greatly advancing the procedure of industrialization of petroleum chemical clean production.

Through extensive and intensive investigation, the inventors obtain the following technical concept:

First of all, in closed-cycling treating process for coke-cooling wastewater, a solid-liquid separating device is further disposed, so as to separate from the liquid phase the solid coke breeze or active carbon powder which represents 0.01-2% by weight in the coke-cooling wastewater. Since the coke breeze or active carbon powder adsorbs many sulfides, it is, under pressure, directly delivered to burner, or delivered to closed coke pool to be temporarily stored, then delivered through airflow to burner if necessary. At the time of utilizing thermal energy, $SO_2$ produced in the burner is recovered to be made into industrial sulfuric acid. The closed treating of the coke breeze is thus realized.

Secondly, a single stage high efficiency oil remover is used to subject the liquid phase (wastewater containing oil and sulfur, simply called as "coke-cooling wastewater" in engineering practice) from solid-liquid separator (or called as coke breeze separator) to oil-removing separation, the single stage oil removing efficiency of which is up to 70-80%. After the separated oil phase (heavy oil) enters into oil tank for further purification, it returns to coke tower for reprocessing, or it is stored in the oil tank, then pumped into coke tower to conduct oil refining when needed, thus realizing oil circulation recovery process. After the separated water phase is cooled through heat changer to be lower than 55° C. according to engineering requirement, preferably lower than 50° C., it enters into cool coke tank, then pumped into coke tower, if necessary, to realize cool coking process of water circulation utilization.

At the initial stage of cool coking process, i.e. starting stage, the amount of coke breeze in the coke-cooling wastewater is relatively low. In order to sufficiently adsorb the sulfides in wastewater, the amount of coke breeze in the coke-cooling wastewater should be adjusted, so as to make the amount of coke breeze in coke-cooling hot wastewater tank be 0.01-2% by weight. For example, the coke breeze separated through coke breeze separator returns to coke-cooling hot wastewater tank through branch pipe under pressure, so as to make the amount of breeze in coke-cooling hot wastewater tank be 0.01-2% by weight (or higher), then the branch pipe is closed, and meanwhile, the pipe for delivering coke breeze to burner or coke pool is opened. Furthermore, at the initial stage of cool coking process, a large amount of steam, oil gas and volatile sulfur-containing foul odor gas are escaped from the coke tower, therefore, a line blender is preferably used to primarily solve the problem that pollution source is escaped in the form of gas phase.

However, in the cool coking process, the amount of coke breeze in the produced coke-cooling wastewater is usually 0.01-2% by weight, so there is usually no need to adjust the amount of coke breeze.

When the cool coking process is ended, some coke-cooling wastewater (in engineering practice, at least hundreds of cubic meters) containing 0.01-2% by weight of coke breeze still remains in the coke-cooling hot wastewater tank. Therefore, if the operation stops at this time, the coke breeze contained in the cool coke water in the coke-cooling hot wastewater tank will inevitably settle to cumulate, thus difficult to be cleaned; while if the coke-cooling wastewater is freely discharged to oil trap, a secondary pollution will be inevitable. Consequently, there is a technical means in the method of the present invention, i.e. although the cool coking process is ended and the cool coke water no longer enters into coke tower, the coke-cooling wastewater remained in the coke tower must be discharged into coke-cooling hot wastewater tank from the bottom, therefore, liquid-solid separation process and oil-water separation process must continue, wherein in the separated water phase, some water is stored in cool coke water tank, while some water may be pumped into coke-cooling hot wastewater tank through branch pipe until the amount of coke breeze contained in the "wastewater" in the coke-cooling hot wastewater tank is lowered to the intended low concentration (for example, 0.01% by weight or lower). At this time, the coke breeze contained in the "wastewater" has a small particle size, and settles slowly. The deposit is loose, which will not affect the subsequent operation. Summing up, the problem that when cool coking process is ended, the coke-cooling wastewater remained in the coke-cooling hot wastewater tank should be closely purified is solved through the above means.

In particular, the above technical concept of the present invention is realized by the follow manner:

A coke breeze separator is disposed between a coke-cooling hot wastewater tank and an oil-water separator, and the coke-cooling wastewater (referring to the hot wastewater produced in the cool coking process industrially, hereinafter the same) is pumped into the coke breeze separator, wherein a majority of solid coke breeze is separated from the coke-cooling wastewater through the coke breeze separator, and the separating efficiency is up to 70-80%. The separated liquid phase (merely containing fine coke breeze particles) is delivered to the oil-water separator under pressure (now, the contained fine coke breeze particles will not affect the normal run of the oil-water separator). Under stable operation condition, the separated coke breeze is delivered to a burner in gas production work section under pressure, or stored in a closed coke pool, then delivered by airflow to burner if necessary to realize the overall utility of coke breeze. For example, at the time of utilizing thermal energy, the produced gas can be used as a synthesis gas to absorb $SO_2$ in the separator to produce industrial sulfuric acid, etc. The pump which pumps the coke-cooling wastewater can be a conventional pump, preferably a delivery pump controlled by frequency control technique. Such a pump has the advantage of reducing the break and emulsification of oil drop in the pumping process of coke-cooling wastewater and improving the separation efficiency of oil-water separation process.

The liquid phase separated by the coke breeze separator is an oil-containing wastewater comprising a few fine coke breeze particles and sulfides, wherein the amount of the oil phase is usually 1-10% by weight (hereinafter simply referring the liquid phase to "coke-cooling wastewater" according to industrial practice). The liquid phase is delivered to a high efficiency oil-water separator under pressure to be separated into oil phase and water phase. The oil phase is first delivered to an oil tank or a waste oil tank under pressure, wherein a little water entrained in the oil phase can be separated by gravity settlement in an oil tank or a waste oil tank, and the separated water accumulated on the bottom of lower layer is discharged through water phase outlet and back to the inlet of delivery pump through pipe, to realize loop circulation treatment. The oil phase on the upper layer is mostly heavy oil for oil refining, which can be delivered to the oil tank, and if necessary, again pumped to a coke tower for oil refining, to realize the closed recovery of oil phase and oil circulation reprocessing. The water phase is delivered through a closed heat changer under pressure to be cooled to reach the temperature requested by oil refining engineering, i.e. lower than 55° C., preferably lower than 50° C., then enters into a cool coke water tank, and if necessary, is again pumped to the coke tower to run water cooling coke operation, to realize the closed circulation of water phase, i.e. water circulation.

The coke breeze separator (or referring to solid-liquid separator) adapted for the present invention is not specially limited, which can be a hydrocyclone or a gravity separator, but the hydrocyclone is preferred. The inner surface of the hydrocyclone is coated with an abrasive resist material such as a glass lining or other similar material, to improve the life time of the hydrocyclone.

The high efficiency oil-water separator adapted for the present invention is not specially limited, which can be one of an improved cyclone oil-water separator, coarse granulation oil-water separator, and cyclone-jet flow-coarse granulation oil-water separator.

The heat exchanger adapted for the present invention is not specially limited, which can be one or more of air cooling type heat changer, shell type heat changer, plate type heat changer, plate-fin type heat changer, and spiral laminal type heat changer. The heat exchanging manner can be that multiple heat exchangers are connected in parallel, or connected both in series and in parallel, depending on the engineering scale, but to ensure that the temperature of water phase in the heat exchange outlet is lower than design temperature (usually lower than 55° C.), so as to meet the requirement on the temperature of cool coke water in the cool coking process.

One or more of the coke-cooling hot wastewater tanks can be disposed, but preferably, usually more coke-cooling hot wastewater tanks are disposed. To facilitate the technical modification of the prior enterprises and save modification cost, the oil separating pool of the prior engineering is preferably modified into a closed oil separating pool. Such a technical modification means is beneficial for the spreading and application of the present invention in industry.

Furthermore, to solve the problem that oil-containing odor is escaped from the coke tower at the initial time of cool coking process, it is preferable to use a line blender, such as a venturi type blender, a jet pump, and etc. Thus, the problem that oil-containing odor is escaped is solved in view of pollution source. The venturi type blender has a simple structure and a good blending effect.

The circulation treating method and equipment of the present invention can also be used for treating other oil-laden wastewater and circulation use of component, as well as treating oil-laden waste gas and circulation use of component Now, the method and equipment of the present invention are described in conjunction with the drawing.

See FIG. 1. When oil refining process transfers to the cool coking process, cool water pump 10 is started to pump the cool water or recovered cool coke water in cool coke water tank 8 through pipe into coke tower 1 from inlet 12 to conduct cool coking process. The produced coke-cooling wastewater (a hot wastewater containing a portion of steam, sulfides, coke breeze, oil, etc., the temperature of which being 85-105° C.) is introduced from outlet 11 through pipe into coke-cooling hot wastewater tank 3 from inlet 13, and upon reaching a certain volume such as 100 m$^3$, coke-cooling hot wastewater pump 4 is started to pump the coke-cooling wastewater through inlet 16 into coke breeze separator 5 to conduct solid-liquid separation. Under stable condition, the separated coke breeze is a carbon powder adsorbing many sulfides, which is discharged from coke breeze phase outlet 18 into closed coke pool 2 or directly delivered to a burner under pressure to conduct post-processing, so as to realize the overall utility of coke breeze. The separated liquid phase is a oil-containing water phase comprising a few fine coke breeze particles, which enters from liquid phase outlet 19 through pipe into oil-water separator 6 via inlet 20 to conduct high efficiency oil-water separation to obtain an oil phase and a water phase. The oil phase entraining a little water is introduced from oil phase outlet 22 through pipe into oil tank 9 via inlet 26, wherein a little water entrained in the oil phase is separated by gravity settlement in oil tank 9, then accumulated on the bottom of oil tank 9 and discharged through outlet 27, and back to the hot water pump 4 to realize closed loop circulation treatment. The oil phase accumulated on the top of the oil tank 9 can, according to the requirement of oil refining process, be back from outlet 28 through oil pump (not shown) to the coke tower 1 for oil refining, to realize the closed loop circulation for recovering oil in the oil refining engineering, i.e. oil circulation. The water phase separated through oil-water separator 6 (water entraining a little oil), which has a better work environmental sanitation standard than that stipulated by nation, and is sufficient to meet the requirement of delayed coking industry, is introduced from water phase outlet 21 through pipe into heat exchanger 7 to be cooled to be lower than 55° C., then introduced from outlet 23 through pipe into cool coke water tank 8, and pumped to the bottom of the coke tower 1 through cool water pump 10, to realize the closed loop circulation of cool coke water in the cool coking process, i.e. water circulation.

When the cool coking process starts, since the amount of coke breeze (active carbon) in the coke-cooling wastewater is relatively low, in order to sufficiently adsorb sulfides, the coke breeze is discharged from coke breeze separator 5 under pressure, then through branch pipe back to the coke-cooling hot wastewater tank 3 from inlet 17, to make the amount of coke breeze in the coke-cooling wastewater increase to be 0.01-2% by weight. Then, the process is run according to the above stable condition. Furthermore, at the initial stage of cool coking process, since the temperature in the coke tower 1 is high, a portion of steam, oil gas and sulfide gas are inevitably escaped from the upper outlet 11 of the coke tower 1, therefore, a line blender 29 can be placed near outlet 11, which can not only condense the gas phase pollution, but also make the coke-cooling wastewater at high temperature (85-125° C.) rapidly cool. The placement of line blender 29 is beneficial for recovering oil phase, and primarily solve the problem that pollution source is escaped in the form of gas phase. The line blender is preferably a venturi type hydraulic jet blender. When the cool coking process is ended, since hundreds of cubic meters of the coke-cooling wastewater still remains in the coke-cooling hot wastewater tank 3 wherein 0.01-2% by weight of the coke breeze is contained, if the operation of the coke-cooling wastewater system stops at this time, the coke breeze in the coke-cooling hot wastewater tank 3 will inevitably settle to cumulate. The cleaning of deposit is rather difficult, and will result in secondary pollution. In the past, the method that the coke-cooling wastewater in the coke-cooling hot wastewater tank 3 is discharged into the oil separating pool just upon stopping the operation is used in engineering, to avoid the problem that the deposit is difficult to be cleaned. However, such a method results in environmental pollution, and the foul odor is inevitable. To prevent the environmental pollution, in the present invention, when the cool coking process is ended, i.e. the valve through which the cool coke water enters into coke tower 1 is closed, the valve through which the cool coke water enters into the top of coke-cooling hot wastewater tank 3 is immediately opened, such that a part of cool coke water returns, via inlet 15, to the coke-cooling hot wastewater tank 3 through branch pipe, and the treatment system of the coke-cooling wastewater continues to run. A majority of the treated cool coke water is stored in the cool coke water tank 8, while a minority of the treated cool coke water is back to the coke-cooling hot wastewater tank 3, until the amount of coke breeze in the coke-cooling wastewater in the coke-cooling hot wastewater tank 3 is no more than 0.01% by weight.

The method and equipment of the present invention have the following advantages:

(a) low cost for equipment, at least 30% lower than that of utility model patent ZL 02216056;

(b) good effect for purifying coke-cooling wastewater, effectively preventing sulfur pollution and foul odor pollution;

(c) saving resources and improving the overall utility of the resources; and (d) improving the cool coking efficiency.

Now, the present invention is further illustrated in detail in conjunction with the Example. However, it should be understood that the present invention is not limited to the

EXAMPLE

Example 1

In an oil refining equipment having a treating capacity of 1,000,000 tons of heavy oil per year, a closed-cycling process unit for delayed coke-cooling water as shown in FIG. 1 was disposed, and the specific run process thereof and its effect were described as follows:

When oil refining process transferred to the cool coking process, cool water pump 10 was started to pump the cool coke water in cool coke water tank 8 through pipe into coke tower 1 via inlet 12, wherein the flow rate of the cool coke water was 200 tons/hour. After the coke tower was gradually filled in, the coke-cooling wastewater was escaped from the upper outlet 11 of the coke tower 1 (the temperature of the escaped coke-cooling wastewater was 85-125° C.) and introduced into coke-cooling hot wastewater tank 3 via inlet 13 through pipe. When the cool coking process was ended and the water was discharged, the coke-cooling wastewater in the coke tower 1 had a temperature of 55-85° C., and was discharged from the bottom outlet 12 (the inlet also could be used as the outlet) of the coke tower, through pipe into the coke-cooling hot wastewater tank 3 via inlet 13. When the coke-cooling wastewater in the coke-cooling hot wastewater tank 3 was accumulated to 100 m$^3$, hot water pump 4 was started. The coke-cooling wastewater in the coke-cooling hot wastewater tank 3 was pressurized by the hot water pump 4, then along the pipe into coke breeze separator 5 (hydroclone) via inlet 16 to obtain a solid phase and a liquid phase by separation, wherein the flow rate of the solid phase accounted for 2-20% by volume of the input flow rate, and the flow rate of the liquid phase accounted for 98-80% by volume of the input flow rate. The separated solid phase was discharged from the breeze phase outlet 18, through pipe back to the coke-cooling hot wastewater tank 3 via inlet 17 at the initial stage of the operation, so as to make the amount of coke breeze in the coke-cooling wastewater in the coke-cooling hot wastewater tank 3 increase to be 0.01-2% by weight, such that the coke breeze could sufficiently adsorb and remove sulfur, then the system ran under the normal operation, at this time, the separated solid phase was delivered along pipe to closed coke pool 2 under pressure. The separated liquid phase was discharged from liquid outlet 19, and introduced along pipe into oil-water separator 6 (cyclone) via inlet 20 under pressure to obtain an oil phase and a water phase by separation, wherein the flow rate of the oil phase accounted for about 1-10% by volume of the input flow rate, and the flow rate of the water phase accounted for about 99-90% by volume of the input flow rate. The oil phase was discharged from the oil phase outlet 22, and introduced along pipe into oil tank 8 via inlet 26. A little water entrained in the oil phase was auto-separated by gravity settlement in the oil tank 8 and accumulated on the bottom of the oil tank 8, which was discharged from outlet 27 and introduced into the inlet of hot water pump 4 along the pipe, to conduct closed loop circulation treatment. The oil phase on the top of the oil tank could be incorporated into the oil tank for raw heavy oil, and if necessary (i.e. oil refining process was started), it could be pumped, as the raw material for oil refining, through a pump (not shown) into the coke tower to conduct reprocessing. The water phase was discharged from water phase outlet 21, and introduced along pipe into heat exchanger 7. After fully heat exchanging, the temperature of the cool coke water discharged from the heat exchanger outlet 23 was lower than 50° C., then the cool coke water was introduced into the cool coke water tank 8 through the pipe, and pumped along the pipe into the coke tower 1 through cool water pump 10 to continue the cool coking process, i.e. to realize the water circulation. Under normal condition, the discharge rate of the coke-cooling wastewater was 200 tons/hour, and the circulation cool coking process ran for about 9 hours. The high temperature coke-cooling wastewater escaped from the top of the coke tower 1 could be blended with some low temperature coke-cooling wastewater in the line blender (29) under 0.1-0.25 MPa absolute pressure (0-0.15 MPa gauge pressure, wherein 0 MPa corresponded to normal pressure), then introduced into the coke-cooling hot wastewater tank 3, thus, the volatilization of foul odor oil gas could be effectively eliminated. After the cool coking process was ended, the amount of the coke-cooling wastewater located below the overflow discharge outlet 11 of the coke tower 1 was 200 tons per tower, totally 600 tons (three coke towers running simultaneously). These remained coke-cooling wastewater was discharged from the bottom outlet 12 (the inlet 12 was also used as outlet), and introduced through branch pipe into the coke-cooling hot wastewater tank 3 from inlet 13. The method of the present invention was used to continuously run the equipment more than 3 hours, until the cool coke water back to the coke-cooling hot wastewater tank 3 made the amount of coke breeze in the cool coke water in the coke-cooling hot wastewater tank 3 lower to be 50 mg/L. The method of this Example was used to measure $H_2S$, methanethiol, dimethyl sulfide and methyl disulfide for the surrounding environmental air quality by gas chromatograph according to GB/T14678-93 air quality monitoring standard, and to measure the foul odor in the air by "three points comparison type smell method" according to GB/T14675-93. The measurements show that this Example efficiently solved the problem of treating coke-cooling wastewater in the oil refining chemical engineering process, and make the cool coking process no longer pollute the environment, so as to realize the object of clean production.

The effects comparison of pre-modification and post-modification were as follows:

1. air pollution:
  pre-modification: cool water tower released foul odor, and oil separating pool released foul odor;
  post-modification: none;
2. resources saving and utility:
  pre-modification: a portion of water was circularly used, heavy oil was not recovered or merely a little was recovered, and all oil gas was volatilized;
  post-modification: all of water was circularly used, 98% of heavy oil was recovered, 90% of oil gas was recovered, and water consumption was decreased by 95%;
3. production yield of equipment:
  pre-modification: cool water temperature of cool coke water did not reach the standard, thus affecting the cool coking efficiency;
  post-modification: cool water temperature of cool coke water absolutely reached the standard.

It could be seen that by using the method of the present invention, the problem of purifying the coke-cooling hot wastewater produced in the cool coking process was soundly solved, i.e. realizing the closed treatment for coke breeze and the subsequent overall utility, the closed circulation treatment for water, and the closed circulation treatment for oil, and the pollution-free discharge was realized soundly, so as to efficiently advance the industrialization process of petroleum chemical clean production.

All references cited in this invention are cited as reference in the present application, just like each of them is individually cited as reference. Although the present invention has been illustrated in detail for the purpose of clarity and understanding, upon reviewing the description of the present application, those skilled in the art will readily understand that various amendments and modifications can be made in the present invention without departure of the spirit and substance of the present invention. Such amendments and modifications fall within the scopes of the attached claims and their equivalents.

What is claimed is:

1. A method for treating coke-cooling wastewater, comprising the following steps:
  (a) cooling the coke-cooling wastewater produced in a delayed coking process to 5-55° C. under 0.1-0.25 MPa absolute pressure, to obtain cooled coke-cooling wastewater;
  (b) subjecting the cooled coke-cooling wastewater to solid-liquid separation, to obtain a coke breeze phase and a liquid phase;
  (c) further separating the obtained liquid phase, to obtain an oil phase and a water phase; and
  (d) further discharging water from the obtained oil phase, to obtain the separated oil phase.

2. The method of claim 1, wherein the amount of the coke breeze in the coke-cooling wastewater is 0.01-2% by weight.

3. The method of claim 1, wherein after the water phase is cooled to 5-50° C. through heat exchange, 60-90% of the water goes through water circulation cool coking process, while 10-40% of the water is mixed with the coke-cooling wastewater.

4. The method of claim 1, wherein in the step (d), the water is discharged from the obtained oil phase through gravity settling, and the discharged water is utilized by water circulation; while the separated oil phase is reprocessed by oil circulation or used in oil refining by combining with raw heavy oil.

5. The method of claim 1, wherein when the cool coking process is ended, the coke-cooling wastewater treating process continues until the amount of the coke breeze in the coke-cooling wastewater is lowered to 0.01% by weight.

6. An equipment for the method of claim 1, comprising: coke tower (1); line blender (29) connected to the coke tower (1), which is used to cool the coke-cooling wastewater from the coke tower (1); coke breeze separator (5) used to separate the coke-cooling wastewater blended in the line blender (29); closed coke pool (2) connected to coke breeze phase outlet (18) of the coke breeze separator (5); oil-water separator (6) connected to liquid phase outlet (19) of the coke breeze separator (5); and oil tank (9) connected to oil phase outlet (22) of the oil-water separator (6), which is used to further separate the oil phase.

7. The equipment of claim 6, wherein the coke breeze separator (5) is also connected to coke-cooling hot wastewater tank (3) storing the coke-cooling wastewater via its coke breeze phase outlet (18).

8. The equipment of claim 7, wherein hot water pump (4) used to pump the coke-cooling wastewater is disposed between the coke-cooling hot wastewater tank (3) and the coke breeze separator (5), and the hot water pump (4) is preferably a delivery pump controlled by frequency control technique.

9. The equipment of claim 6, wherein the oil-water separator (6) is also connected to heat changer (7) via its water phase outlet (21), and cool coke water tank (8), which is connected to the heat changer (7) and stores the cool coke water cooled by heat exchange to lower than 50° C., is connected to the coke tower (1) and the line blender (29), respectively.

10. The equipment of claim 9, wherein the heat changer (7) is selected from one or more of air cooling type heat changer, shell type heat changer, plate type heat changer, plate-fin type heat changer, and spiral laminal type heat changer, which are connected in parallel, or both in series and in parallel.

11. The equipment of claim 6, wherein the oil tank (9) is also connected to the coke breeze separator (5) which circularly utilizes the discharged water from the bottom of the oil tank (9), and the coke tower (1) which circularly utilizes the separated oil phase from the top of the oil tank (9), respectively.

12. The equipment of claim 6, wherein the line blender (29) is a venturi type blender or a jet pump.

13. The equipment of claim 6, wherein the coke breeze separator (5) is a hydrocyclone or a gravity separator.

14. The equipment of claim 6, wherein the oil-water separator (6) is selected from the group consisting of an improved cyclone oil-water separator, coarse granulation oil-water separator, and cyclone-jet flow-coarse granulation oil-water separator.

* * * * *

UNITED STATES PATENT AND TRADEMARK OFFICE
CERTIFICATE OF CORRECTION

| | |
|---|---|
| PATENT NO. | : 7,419,608 B2 |
| APPLICATION NO. | : 11/748829 |
| DATED | : September 2, 2008 |
| INVENTOR(S) | : Wang et al. |

It is certified that error appears in the above-identified patent and that said Letters Patent is hereby corrected as shown below:

On the Title Page

Item (63) Related U.S. Application Data is missing should read --Continuation of application No. PCT/CN05/00476, filed April 11, 2005.--

Item (30) Foreign Application Priority Data is missing should read --November 15, 2004 (CN) .............................. 200410068149.X--

Signed and Sealed this

Thirtieth Day of November, 2010

David J. Kappos
*Director of the United States Patent and Trademark Office*